Sept. 18, 1951     J. H. KINDELBERGER     2,568,640
SELF-LOCKING BOLT

Filed Aug. 21, 1948     2 Sheets-Sheet 1

J. H. KINDELBERGER
INVENTOR.

BY William R. Lane
ATTORNEY

Sept. 18, 1951 J. H. KINDELBERGER 2,568,640
SELF-LOCKING BOLT

Filed Aug. 21, 1948 2 Sheets-Sheet 2

J. H. KINDELBERGER
INVENTOR.

BY *William R. Lane*
ATTORNEY

Patented Sept. 18, 1951

2,568,640

UNITED STATES PATENT OFFICE 2,568,640

SELF-LOCKING BOLT

James H. Kindelberger, Pacific Palisades, Calif.

Application August 21, 1948, Serial No. 45,468

5 Claims. (Cl. 151—7)

This invention relates to an arrangement for interlocking nuts and bolts. The invention more particularly pertains to bolts so constructed that an ordinary nut when screwed thereon will be self-locking.

It is therefore an object of this invention to provide a locking element between the nut and the bolt which automatically functions to lock one of them with respect to the other.

It is a further object of this invention to provide a self-locking arrangement which is positive in operation and which functions with increased effectiveness as the nut and bolts are brought into interengagement.

Further objects of invention will become apparent from the following description taken in connection with the accompanying drawings, in which Fig. 1 is an elevational view of the shank of a bolt having the invention incorporated therein;

Figure 10:
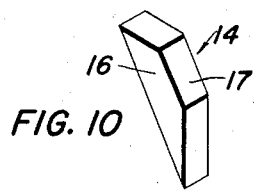
Figure 8:
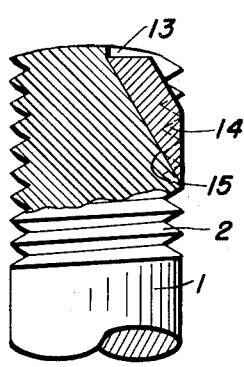
Figure 9:
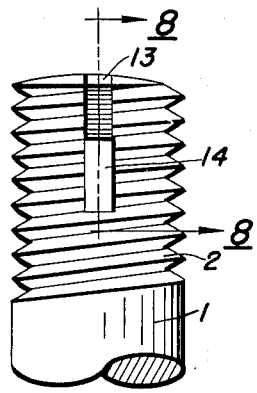

Figs. 8 and 9 are sectional and elevational views, respectively, of still another modified form of the invention, Fig. 8 being a view along line 8—8 of Fig. 9; and Fig. 10 is a perspective view of the elastic element used in the embodiment of the invention illustrated in Figs. 8 and 9.

Referring to the drawings, bolt 1 is provided with a threaded portion 2 having therein an inclined recess 3, or the like, which in the preferred embodiment of the invention is V-shaped, the inclination being with respect to the longitudinal axis of the bolt. An elastic element 4, which is ordinarily shaped to conform to the recess, is adapted to be received therein. This elastic element may be made of any suitable material and may be fibrous, wood, rubber, or plastic materials such as methyl-methacrylate, nylon, or the like. The material must be sufficiently plastic to be deformable, and yet sufficiently elastic so as to offer a locking action between the nut or female member 8 and the bolt when forced into frictional engagement. The elastic element is provided with a base portion 5, a pair of side surfaces 6, and inclined edges 7. It is so proportioned that when received in the recess 3, base portion 5 lies below the end of the nut, inclined faces 7 permitting ready engagement of the nut with the first threads of the bolt. Further, the elastic element is of greater width than the root diameter of the bolt threads so that the inclined surfaces 7 will be engaged by the threads of the nut and the elastic element forced downwardly and outwardly into engagement therewith. Accordingly, there will result a locking action between the nut and the bolt which is positive and which will always properly function.

The invention is particularly adapted for use with stud bolts where it is undesirable or impossible to use other locking means. Also, the elastic element may be placed at the inner rather than the outer end of the threaded portion of the bolt. This would be particularly useful where the bolts are used as studs and it is desired to have a locking action as the final part of the engagement of the nut and the bolt.

Figure 1:
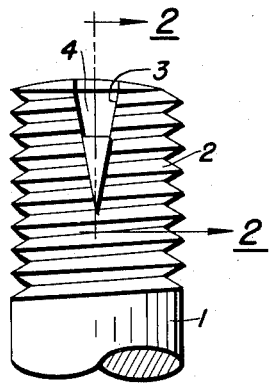
Figure 2:
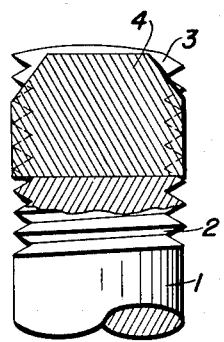
Fig. 2 is a sectional view taken along the line 2—2 of Fig. 1.
Figure 3:
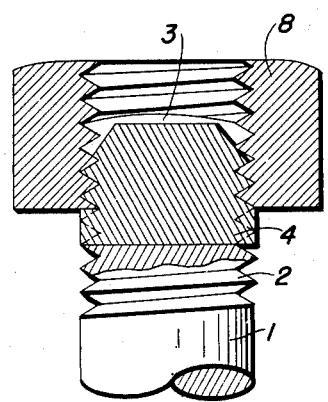
Fig. 3 is a sectional view similar to Fig. 2 with a nut partially engaging the bolt.
Figure 4:
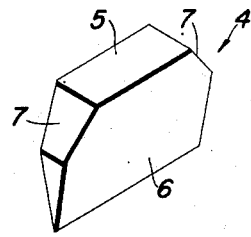
Fig. 4 is a perspective view of the elastic element.
Figure 5:
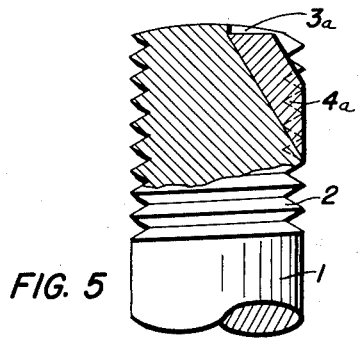
Figs. 5 and 6 are sectional and elevational views, respectively, of a modified form of the invention, Fig. 5 being taken along the line 5—5 of Fig. 6.
Figure 6:
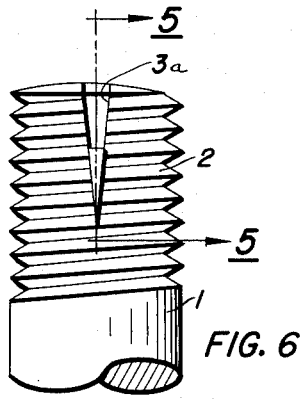
Figure 7:
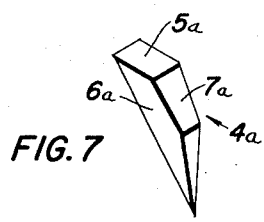
Fig. 7 is a perspective view of the elastic element used in the modified form illustrated in Figs. 5 and 6.

The invention may be practiced by the use of inclined surfaces other than the notch shown and described in Fig. 1. For instance, an arrangement such as illustrated in Figs. 5, 6, and 7 may be used, wherein V-shaped recess 3a extends only partly through the bolt to receive a corresponding elastic element 4a. This provides a locking action only at one part of the bolt rather than at two places as illustrated in Figs. 1–4. Otherwise, the parts are similar in function and operation with that illustrated in those figures.

Another embodiment of the invention is illustrated in Figs. 8, 9, and 10, in which bolt 1 is provided with a recess 13 for receiving an elastic element 14. The recess 13 is of uniform width and is provided with a surface 15 inclined to the longitudinal axis of the bolt. The elastic element 14 is of uniform width and is otherwise shaped to conform to the recess. It is also provided with parallel sides 16 conforming to the sides of the recess 13 and the tapered surface 17 corresponding to surface 7 of element 4.

In the operation of this form of invention the threads of the nut engage surface 17 forcing the elastic element downwardly and outwardly to cause an interlocking engagement between the nut and the bolt.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A self-locking bolt comprising a threaded shank having a V-shaped recess in the threaded end thereof extending transversely through the shank, at least one of the surfaces of said recess being inclined with respect to the longitudinal axis of said bolt; a V-shaped element of resilient plastic material received in said recess with the surfaces of the element in engagement with the corresponding surfaces of the recess and opposed side portions of the element projecting beyond the inner root diameter of said threads to be engaged by threads of a nut member screwed on said bolt to force the projecting portions of said element into firm engagement with the threads of said nut and bolt to thereby interlock the nut and bolt, said projecting portions being provided with an inclined face to expose at least one thread of said bolt for ready engagement by said nut.

2. A self-locking bolt comprising a shank having a threaded end portion and a recess formed in said end portion and interrupting the threads, said recess being formed with the largest cross-sectional area at the extreme outer end of said end portion and of constantly diminishing cross-sectional area as said recess extends longitudinally of said shank from said outer end; an element of resilient plastic material received in said recess with the lower portion of said element completely filling the corresponding portion of said recess and projecting beyond the inner root diameter of said threads to be engaged by threads of a female member to force said projecting portion into firm engagement with the threads of said female member to thereby interlock the female member and bolt, the upper portion of said element being tapered toward its upper end to expose at least one thread of said bolt for ready engagement by the threads of said female member.

3. A device as recited in claim 2 in which said recess comprises sides forming a V-shape.

4. A device as recited in claim 2 in which said recess comprises a bottom which is inclined with respect to the longitudinal axis of said bolt.

5. A device as recited in claim 2 in which said recess comprises parallel sides and a bottom which is inclined with respect to the longitudinal axis of said bolt.

JAMES H. KINDELBERGER.

REFERENCES CITED

The following references are of record in the file of this patent:

UNITED STATES PATENTS

| Number | Name | Date |
|---|---|---|
| 771,935 | Reynolds | Oct. 11, 1904 |
| 909,033 | Smith | Jan. 5, 1909 |
| 1,158,454 | DeCamp | Nov. 2, 1915 |
| 2,159,866 | Simmonds | May 23, 1939 |
| 2,318,415 | Patzschke | May 4, 1943 |
| 2,407,160 | Kahn | Sept. 3, 1946 |
| 2,409,638 | Lyon | Oct. 22, 1946 |
| 2,421,105 | Warren | May 27, 1947 |
| 2,462,603 | Boots | Feb. 22, 1949 |
| 2,539,887 | Boots | Jan. 30, 1951 |